(12) United States Patent
Fujimoto et al.

(10) Patent No.: US 9,863,372 B2
(45) Date of Patent: Jan. 9, 2018

(54) CONTROL APPARATUS OF PREMIXED CHARGE COMPRESSION IGNITION ENGINE

(71) Applicant: Mazda Motor Corporation, Aki-gun, Hiroshima (JP)

(72) Inventors: Masahiko Fujimoto, Hiroshima (JP); Hiroyuki Yamashita, Hiroshima (JP); Keiji Araki, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 10 days.

(21) Appl. No.: 15/212,717

(22) Filed: Jul. 18, 2016

(65) Prior Publication Data
US 2017/0022924 A1  Jan. 26, 2017

(30) Foreign Application Priority Data

Jul. 22, 2015 (JP) .................. 2015-144784

(51) Int. Cl.
| | |
|---|---|
| *F02M 25/03* | (2006.01) |
| *F02D 41/00* | (2006.01) |
| *F02M 25/022* | (2006.01) |
| *F02D 19/12* | (2006.01) |
| *F02M 26/13* | (2016.01) |

(Continued)

(52) U.S. Cl.
CPC ......... *F02M 25/0224* (2013.01); *F02D 19/12* (2013.01); *F02D 41/0025* (2013.01); *F02D 41/0057* (2013.01); *F02D 41/3035* (2013.01); *F02M 25/0222* (2013.01); *F02M 25/03* (2013.01); *F02M 26/13* (2016.02); *F02D 41/3041* (2013.01); *F02D 41/402* (2013.01); *Y02T 10/128* (2013.01); *Y02T 10/47* (2013.01)

(58) Field of Classification Search
CPC .... F02M 25/03; F02M 25/02; F02M 25/0224; F02M 25/0222; F02M 26/13; F02D 41/00; F02D 41/0025; F02D 41/0057; F02D 41/3035; F02D 41/3041; F02D 41/402; F02D 19/12; Y02T 10/47; Y02T 10/128
See application file for complete search history.

(56) References Cited

U.S. PATENT DOCUMENTS 6,990,949 B2 * 1/2006 Kataoka ................. F02B 1/12
123/295

FOREIGN PATENT DOCUMENTS

JP  2009209809 A  9/2009

* cited by examiner

*Primary Examiner* — Hieu T Vo
(74) *Attorney, Agent, or Firm* — Alleman Hall Creasman & Tuttle LLP

(57) ABSTRACT

A control apparatus of a premixed charge compression ignition engine that includes an engine body having a cylinder and intake and exhaust passages, and causes a mixture gas to self-ignite inside the cylinder is provided. The apparatus includes a fuel injector for injecting fuel into the cylinder, a water injector for injecting supercritical water or subcritical water into the cylinder, an EGR passage for communicating the exhaust and intake passages and recirculating, as EGR gas, a portion of an exhaust gas discharged from the cylinder to the intake passage, an EGR valve for adjusting an EGR gas recirculation amount, and a controller. The controller includes an engine load determining module for receiving a parameter and determining whether an engine operating state is a first state where the engine load is below a switch load or a second state where the engine load is the switch load or above.

16 Claims, 11 Drawing Sheets

(51) Int. Cl.
*F02D 41/30* (2006.01)
*F02D 41/40* (2006.01)

CONTROL APPARATUS OF PREMIXED CHARGE COMPRESSION IGNITION ENGINE

BACKGROUND

The present invention relates to a control apparatus of a premixed charge compression ignition engine, which includes an engine body having a cylinder in which mixture gas self-ignites within at least one of operating ranges of the engine.

Conventionally, a study is conducted about performing premixed charge compression ignition combustion in the engine, in order to improve fuel consumption. In the premixed charge compression self-ignition combustion, fuel and air are premixed to form a mixture gas and the mixture gas is compressed to self-ignite.

However, for example, when an engine load is high, an issue of producing more smoke arises due to the mixture gas igniting before the fuel is sufficiently mixed with air, and further, an issue of worsening combustion noise arises due to an increase in pressure inside the cylinder of the engine.

In this regard, a study is conducted about performing Exhaust Gas Recirculation (EGR) in which EGR gas (a portion of the exhaust gas) is recirculated to an intake passage, to introduce an inactive gas which is neither fuel nor air into the cylinder. In this manner, an ignition delay time of the mixture gas is extended, and as a result, the mixing of the fuel and air is stimulated. JP2009-209809A discloses such an art.

However, there is a limit to the extending effect of the ignition delay time which can be obtained by introducing the EGR gas, and within an engine operating range where an engine load is high, it becomes difficult to secure a suitable length of ignition delay time by the EGR gas introduction. Specifically, within the operating range where the engine load is high, since an amount of air required for combustion becomes large, to recirculate a large amount of EGR gas while securing the air amount, a forced induction needs to be performed, which increases pressure inside the cylinder. However, the ignition delay time becomes shorter as the pressure inside the cylinder increases. Therefore, within this operating range, even if the large amount of EGR gas is recirculated, the ignition delay time may not be extended sufficiently.

SUMMARY

The present invention is made in view of the above situations and aims to provide a control apparatus of a premixed charge compression ignition engine, which is capable of extending an ignition delay time more reliably.

According to one aspect of the present invention, a control apparatus of a premixed charge compression ignition engine that includes an engine body having a cylinder, an intake passage, and an exhaust passage, and causes a mixture gas to self-ignite inside the cylinder, is provided. The apparatus includes a fuel injector for injecting fuel into the cylinder, a water injector for injecting one of supercritical water and subcritical water into the cylinder in a period from a latter half of compression stroke and an early half of expansion stroke, an EGR passage for communicating the exhaust passage with the intake passage and recirculating, as EGR gas, a portion of the exhaust gas discharged from the cylinder to the intake passage, an EGR valve for adjusting an amount of the EGR gas recirculating to the intake passage through the EGR passage, and a controller for controlling various parts of the engine, the various parts including the water injector and the EGR valve. The controller includes an engine load determining module for receiving a parameter of a load of the engine that varies based on an accelerator opening, and determining whether an operating state of the engine body is a first state where the engine load is below a predetermined switch load or a second state where the engine load is the predetermined switch load or above. When the operating state is determined to be the first state by the engine load determining module, the controller outputs control signals to the EGR valve and the water injector, the control signals causing the EGR valve to introduce the EGR gas into the cylinder, and causing an injection amount of the one of the supercritical water and the subcritical water to be smaller than an introduction amount of the EGR gas into the cylinder. When the operating state is determined to be the second state, the controller outputs control signals to the EGR valve and the water injector, the control signals causing the water injector to inject the one of the supercritical water and the subcritical water into the cylinder, and causing the introduction amount of the EGR gas into the cylinder to be smaller than the injection amount of the one of the supercritical water and the subcritical water.

According to this configuration, in both the first and second states, a sufficient length of ignition delay time can be secured and, thus, an increase in production of smoke, and a sharp increase in pressure inside the cylinder which results in increasing combustion noise, can be reduced. As a result, more suitable premixed charge compression self-ignition combustion can be achieved.

Specifically, when the engine load is low, the ignition delay time can be extended mainly by introducing the EGR gas. On the other hand, when the engine load is high, which easily causes the issues of increase in production of smoke and combustion noise, a large amount of water which is a substance other than fuel and air (hereinafter, may be referred to as an "inactive substance"), is directly introduced into the cylinder and the introduction amount of the EGR gas into the cylinder is reduced. Therefore, while reliably securing the sufficient length of ignition delay time by introducing the large amount of the inactive substance into the cylinder, a sufficient amount of air can be introduced into the cylinder without a forced induction compared to a case where the inactive substance consists only of the EGR gas. As a result, an engine output can be secured.

Further, in the above configuration, the one of the supercritical water and the subcritical water is used as the water, and this supercritical water etc. is injected into the cylinder when pressure and temperature of the cylinder are high, which is between the latter half of the compression stroke and the early half of the expansion stroke, so that the water remains inside of the cylinder in a state of the one of the supercritical water and the subcritical water before the ignition of the mixture gas. Therefore, the ignition delay time can be extended more reliably while reducing energy loss.

Specifically, the supercritical water and the subcritical water have higher densities than water in a normal gas phase (water vapor). Therefore, by injecting the one of the supercritical water and the subcritical water, a large amount of water can efficiently be introduced into the cylinder compared to injecting the water in the gas phase. Thus, an oxygen concentration inside the cylinder can be sufficiently decreased and the ignition delay time can be extended more reliably. Additionally, water in a liquid phase requires latent heat to become water vapor, whereas the supercritical water and the subcritical water either do not require latent heat at all or require only low latent heat. Therefore, in a case of injecting the water in the liquid phase into the cylinder, the temperature inside the cylinder may significantly decrease due to water vaporization of the injected water, and thermal efficiency may degrade. In this regard, in the case of injecting the one of the supercritical water and the subcritical water into the cylinder, such significant temperature reduction and thermal efficiency degradation can be avoided. Therefore, while injecting the one of the supercritical water and the subcritical water in an amount that is large enough to sufficiently secure the ignition delay time, the thermal efficiency can be kept high.

Note that, in the present invention, the latter half of the compression stroke is a period between 90° CA (crank angle) before a top dead center of the compression stroke (CTDC) and the CTDC, and the early half of the expansion stroke is a period between the CTDC and 90° CA after the CTDC.

In the above configuration, a geometric compression ratio of the engine body may be set to be between 18:1 and 35:1. An effective compression ratio of the engine body when the engine load may be the switch load or above is set to be between 15:1 and 30:1.

Thus, in the second state, a high engine torque can be secured with the large effective compression ratio while achieving the suitable premixed charge compression self-ignition combustion as described above.

Further, in the above configuration, when the operating state is the second state, the controller may set an air excess ratio to be 1 or below at least while the engine load is high in the second state, and the controller may stop the introduction of the EGR gas into the cylinder at least while the engine load is high in the second state.

In this manner, in a case where the air excess ratio is 1 or below and the ignition delay time easily becomes short, the ignition delay time can be extended more reliably.

Further, in the above configuration, the control apparatus may further include a water processing device for generating the one of the supercritical water and the subcritical water. The water processing device may include a condenser for condensing water vapor contained within the exhaust gas discharged from the engine body, and a heater and compressor for increasing the condensed water vapor in temperature and pressure by supplying thermal energy of the exhaust gas to the condensed water vapor.

With the above configuration, the one of the supercritical water and the subcritical water can be generated by using water vapor within the exhaust gas and thermal energy of the exhaust gas. Therefore, energy efficiency can be improved compared to a case of separately providing a device for generating the water. Note that when the engine load is low, since a temperature of the exhaust gas, in other words, thermal energy of the exhaust gas, is low, it may not be able to generate a large amount of the one the supercritical water and the subcritical water. In this regard, with the above configuration in the first state, since the injection amount of the one of the supercritical water and the subcritical water is reduced and the large amount of the EGR gas is introduced, the ignition delay time can be secured while increasing the thermal efficiency.

Moreover, according to the present invention, the suitable premixed charge compression self-ignition combustion can be achieved more reliably as described above. Therefore, it is effective to apply the present invention to a gasoline engine with which it is comparatively difficult to perform premixed charge compression self-ignition combustion. Thus, the fuel may contain gasoline.

DETAILED DESCRIPTION OF EMBODIMENT (1) Overall Configuration of Engine System

Figure 1:
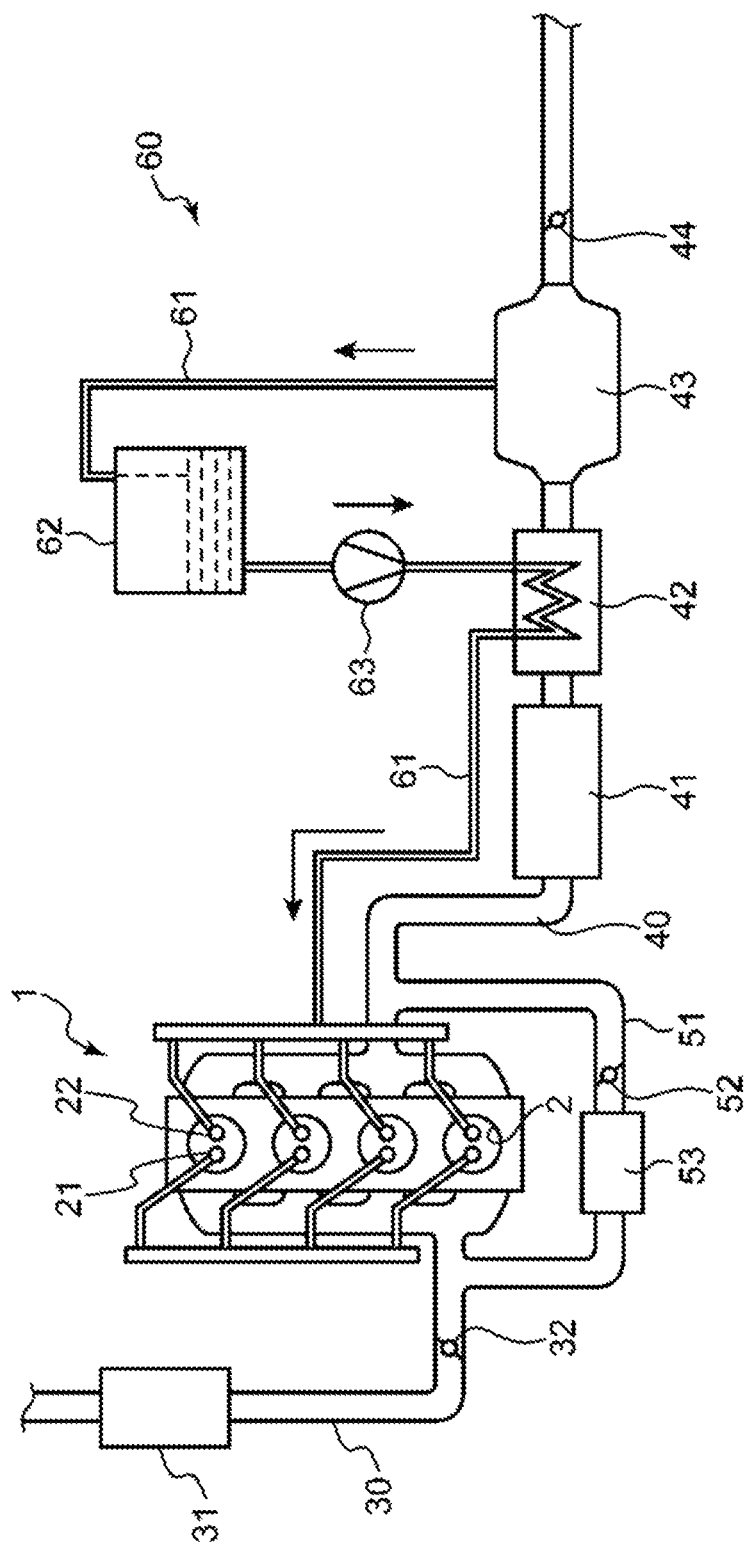
FIG. 1 is a view illustrating a configuration of an engine system according to one embodiment of the present invention.

FIG. 1 is a view illustrating a configuration of an engine system to which a control apparatus of a premixed charge compression ignition engine is applied, according to one embodiment of the present invention. The engine system of this embodiment includes an engine body 1 of a four stroke type, an intake passage 30 for introducing air for combustion into the engine body 1, and an exhaust passage 40 for discharging the exhaust gas generated in the engine body 1. The engine body 1 is, for example, a four-cylinder engine having four cylinders 2. In this embodiment, the engine body 1 is driven by receiving fuel containing gasoline. The engine system of this embodiment is mounted on a vehicle, and the engine body 1 is used as a drive source of the vehicle.

The intake passage 30 is provided with, in the following order from its upstream side, an air cleaner 31 and a throttle valve 32. The air passes through the air cleaner 31 and the throttle valve 32 and then is introduced into the engine body 1.

The throttle valve 32 opens and closes the intake passage 30. Note that, in this embodiment, while the engine is in operation, the throttle valve 32 is basically kept fully opened or nearly fully opened, and only in a limited operation condition (e.g., the engine is stopped) is the throttle valve 32 closed to block the intake passage 30.

The exhaust passage 40 is provided with, in the following order from its upstream side, a three-way catalyst 41 for purifying the exhaust gas, a heat exchanger 42 (heater and compressor), a condenser 43, and an exhaust shutter valve 44. The heat exchanger 42 and the condenser 43 constitute a part of a later-described exhaust heat recovery device 60 (water processing device).

The exhaust shutter valve 44 stimulates a recirculation of the EGR gas to the intake passage 30.

Specifically, with the engine system of this embodiment, an EGR passage 51 communicating a part of the intake passage 30 downstream of the throttle valve 32 and a part of the exhaust passage 40 upstream of the three-way catalyst 41 is formed, and a portion of the exhaust gas is recirculated as the EGR gas to the intake passage 30. Further, the exhaust shutter valve 44 opens and closes the exhaust passage 40. When the EGR is performed and pressure inside the exhaust passage 40 is low, an opening of the exhaust shutter valve 44 is narrowed to increase pressure inside an upstream part of the EGR passage 51 so as to stimulate the EGR gas recirculation.

The EGR passage 51 is provided with an EGR valve 52 (EGR gas amount adjuster) for opening and closing the EGR passage 51, and an amount of the EGR gas recirculated to the intake passage 30 is controlled by adjusting an opening of the EGR valve 52. Further in this embodiment, the EGR passage 51 is provided with an EGR cooler 53 for cooling the EGR gas passing therethrough, and the EGR gas is recirculated to the intake passage 30 after being cooled by the EGR cooler 53.

The exhaust heat recovery device 60 generates supercritical water by using thermal energy of the exhaust gas. Specifically, with the engine system of this embodiment, the supercritical water is injected into the respective cylinders 2 from water injectors 22 as described later, and the supercritical water is generated by using the exhaust gas.

The exhaust heat recovery device 60 includes the heat exchanger 42 and the condenser 43, and additionally a condensed water passage 61, a water tank 62, and a water injection pump 63. The condensed water passage 61 connects the water injectors 22 with the condenser 43.

The condenser 43 condenses water (water vapor) within the exhaust gas passing through the exhaust passage 40. The water tank 62 stores the condensed water therein. The condensed water generated by the condenser 43 is introduced into the water tank 62 through the condensed water passage 61 and stored in the water tank 62.

The water injection pump 63 sends the condensed water inside the water tank 62 to the water injectors 22 through the heat exchanger 42. The condensed water inside the water tank 62 is increased in temperature and pressure by the water injection pump 63 when being sent. For example, the condensed water is increased to about 350 K in temperature and about 250 bar in pressure by the water injection pump 63.

The heat exchanger 42 exchanges heat between the condensed water sent by the water injection pump 63 and the exhaust gas passing through the exhaust passage 40. The heat exchanger 42 is an indirect heat exchanger, and the condensed water receives the thermal energy from the exhaust gas when passing through the heat exchanger 42. By passing through the heat exchanger 42, the condensed water is increased more in temperature and pressure from the state where pressure is applied thereto by the water injection pump 63, and becomes supercritical water.

The supercritical water is water with a higher temperature and pressure than that at the critical point of water, and has a high density close to liquid while molecules move as actively as gas moves. In other words, the supercritical water is water which does not require latent heat for a phase change into gas or liquid. As is described later in detail, in this embodiment, by injecting the water with such properties into the cylinders 2, a long ignition delay time is secured, and suitable premixed charge compression self-ignition combustion is achieved.

Figure 2:
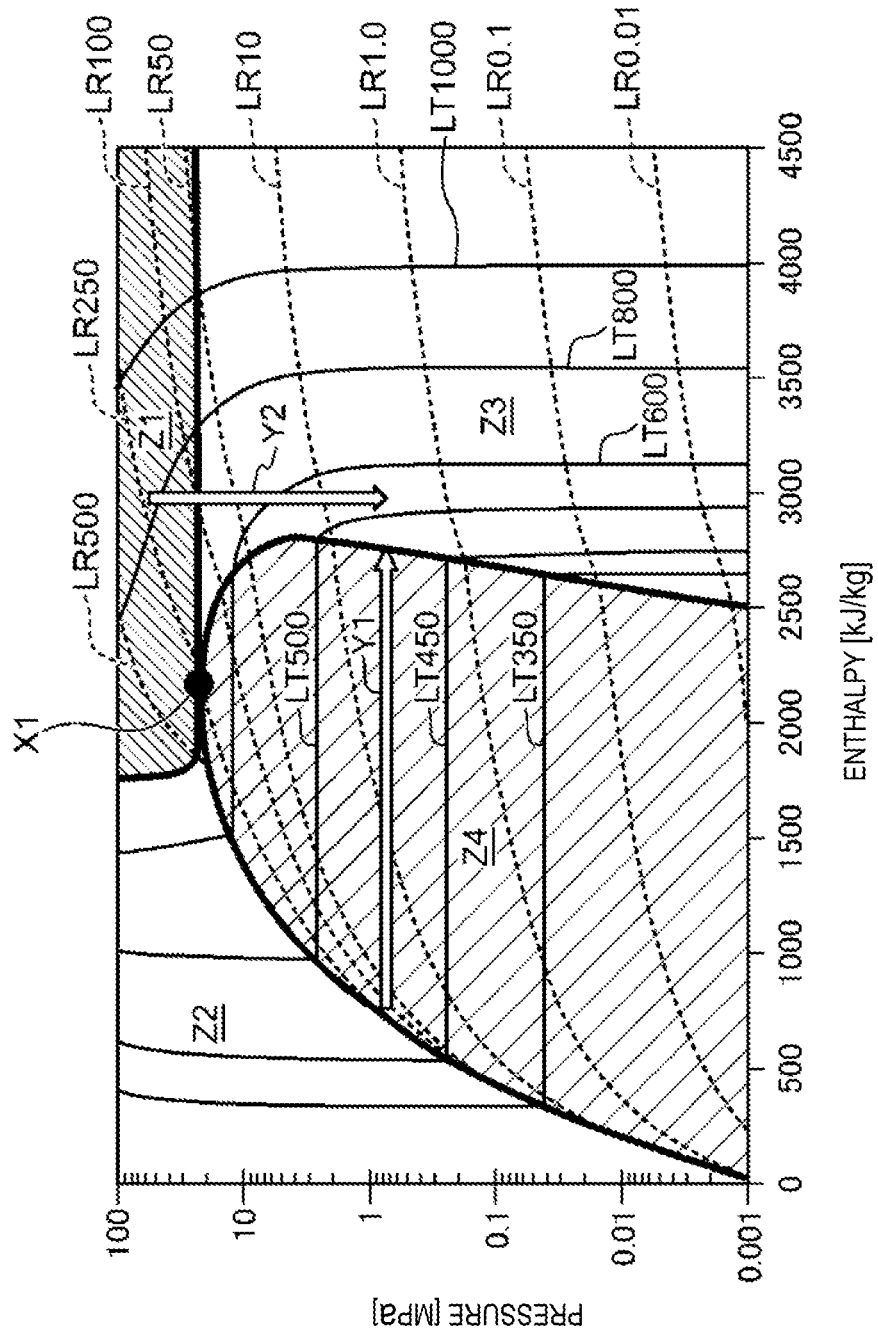
FIG. 2 is a water phase diagram illustrating supercritical water.

A specific description regarding this matter is given with reference to FIG. 2. FIG. 2 is a water phase diagram of which a horizontal axis indicates enthalpy and a vertical axis indicates pressure. In FIG. 2, an area Z2 is an area of liquid, an area Z3 is an area of gas, and an area Z4 is a coexisting area of liquid and gas. Lines LT350, LT400, ..., LT1000 indicated by solid lines are isothermal lines, each formed by connecting points of the same temperature. The numbers of the lines indicate temperatures (K). For example, LT350 is an isothermal line of 350 K, and LT1000 is an isothermal line of 1,000 K. Further, a point X1 is the critical point and an area Z1 is an area where a temperature and pressure are higher than the critical point X1, and the supercritical water belongs to this area Z1. Specifically, while the critical point of water is at the temperature of 647.3K and the pressure of 22.12 MPa, the temperature and pressure of the supercritical water are the same or above, in other words, the temperature is 647.3K or above and the pressure is 22.12 MPa or above.

In FIG. 2, lines LR0.01, LR0.1, ..., LR500 indicated by dashed lines are isopycnic lines, each formed by connecting points of the same density. The numbers of the lines indicate densities (kg/m$^3$). For example, LR0.01 is an isopycnic line of 0.01 kg/m$^3$, and LR500 is an isopycnic line of 500 kg/m$^3$. As is apparent from comparisons of these isopycnic lines LR with the areas Z1 and Z3, the density of the water within the area Z1, in other words, the supercritical water, is about from 50 kg/m$^3$ to 500 kg/m$^3$, which is close to that of water in the liquid phase and much higher than a density of gas.

Note that the supercritical water generated by the engine system and injected into the cylinders 2 preferably has a density of 250 kg/m$^3$ or above.

Further, as indicated by an arrow Y1 in FIG. 2, water in a normal liquid phase requires a high enthalpy to become a gas. In other words, the water in the normal liquid phase requires comparatively high latent heat to change into gas. In this regard, as indicated by an arrow Y2, the supercritical water requires almost no enthalpy, in other words, latent heat, to become water in a normal gas phase.

Figure 3:
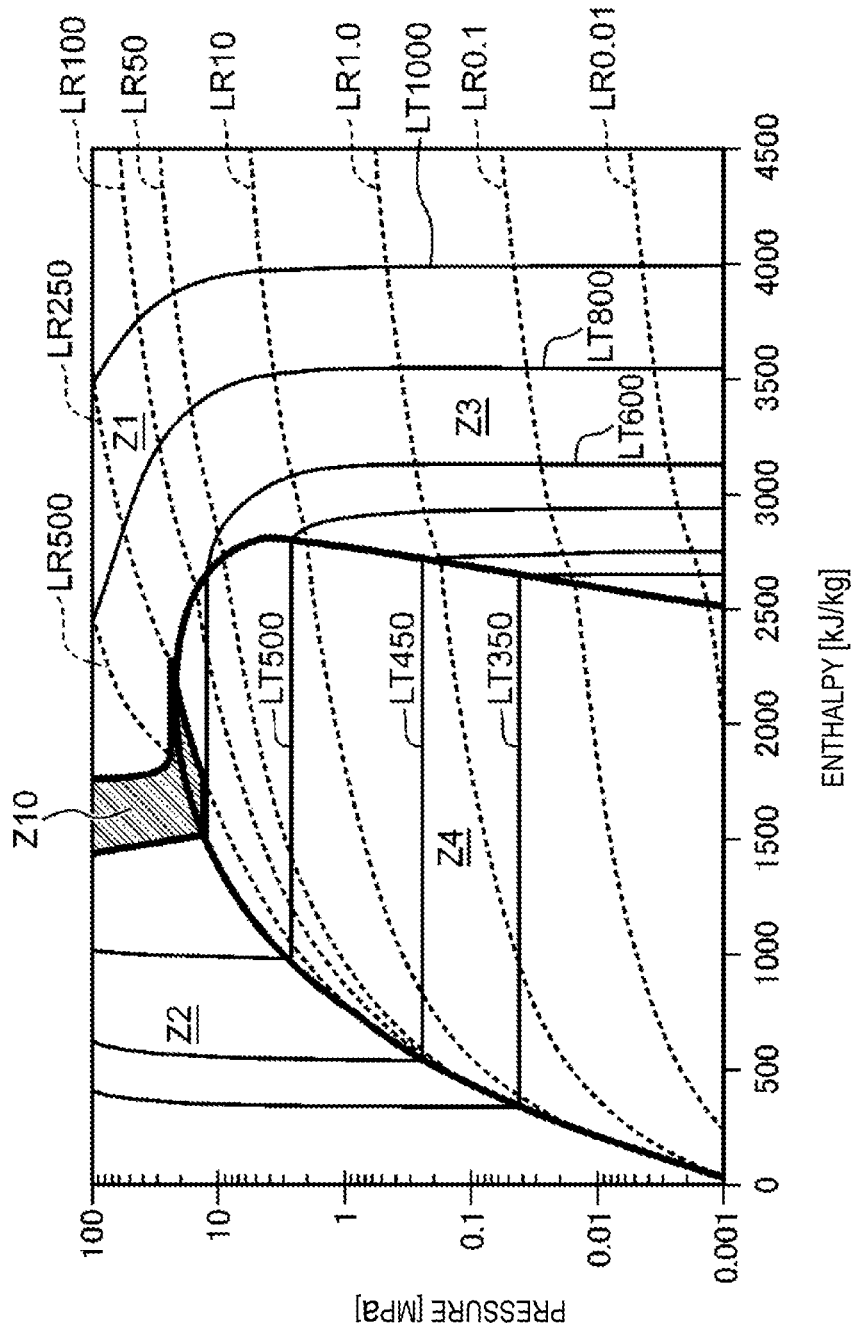
FIG. 3 is a water phase diagram illustrating subcritical water.

Here, as is apparent from FIG. 2, water belonging to an area near the area Z1 has a high density and requires low latent heat to become gas, which are properties similar to the supercritical water. Therefore, although the supercritical water is generated by the exhaust heat recovery device 60 and injected into the cylinders 2 in this embodiment as described above, instead of the supercritical water, subcritical water which is water belonging to the area near the area Z1 may be generated and injected into the cylinders 2. For example, subcritical water within an area Z10 where the temperature is 600 K or above and the density is 250 kg/m$^3$ or above (see FIG. 3) may be generated and injected.

(2) Structure of Engine Body

A structure of the engine body 1 is described next.

Figure 4:
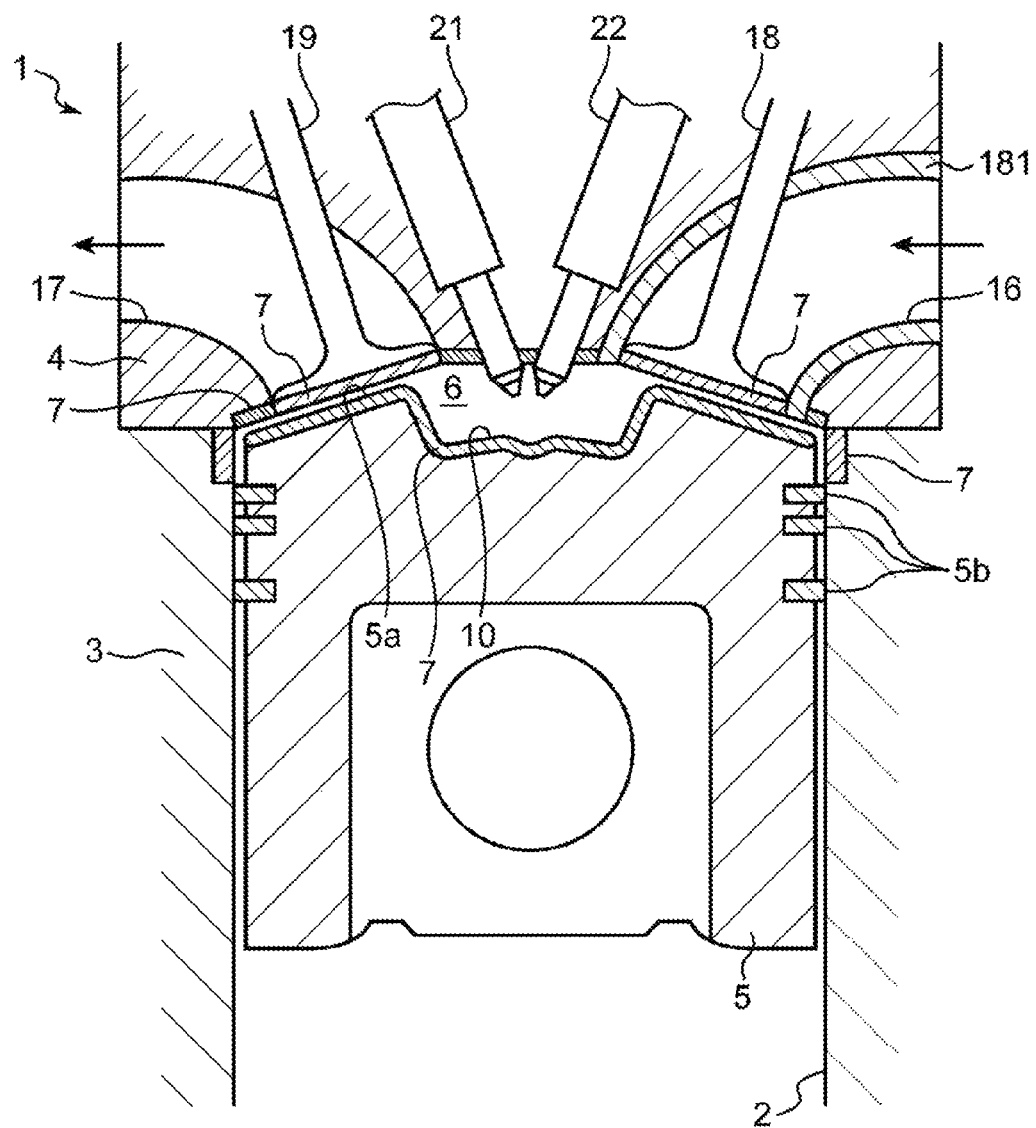
FIG. 4 is an enlarged cross-sectional view schematically illustrating a part of an engine body.

FIG. 4 is an enlarged cross-sectional view illustrating a part of the engine body 1. As illustrated in FIG. 4, the engine body 1 includes a cylinder block 3 formed therein with the cylinders 2, a cylinder head 4 formed on the cylinder block 3, and pistons 5 fitted into the cylinders 2 to be reciprocatable (in up-and-down directions), respectively.

A combustion chamber 6 is formed above each piston 5. The combustion chamber 6 is a so-called pent-roof type, and a ceiling surface of the combustion chamber 6 (a bottom surface of the cylinder head 4) has a triangular roof shape formed by two inclining surfaces on an intake side and an exhaust side.

In this embodiment, to reduce a cooling loss by reducing release of heat of the combustion gas from the combustion chamber 6 to the outside of the combustion chamber 6, wall surfaces (inner surfaces) of each combustion chamber 6 are provided with heat insulating layers 7 having lower thermal conductivity than the inner surfaces of the combustion chamber 6. Specifically, the heat insulating layer 7 is provided to each of a wall surface of the cylinder 2, a crown surface 5a of the piston 5, the bottom surface of the cylinder head 4, and surfaces of valve heads of intake and exhaust valves 18 and 19, which form the inner surfaces of the combustion chamber 6. Note that in this embodiment, as illustrated in FIG. 4, a position of the heat insulating layer 7 provided in the wall surface of the cylinder 2 is limited to be higher (cylinder head 4 side) than piston rings 5b in a state where the piston 5 is at a top dead center (TDC), so that the piston rings 5b do not slide on the heat insulating layer 7.

A specific material of the heat insulating layer 7 is not limited as long as it has the low thermal conductivity as described above. However, the heat insulating layer 7 is preferably made from a material having lower volumetric specific heat than the inner surfaces of the combustion chamber 6. Specifically, when the engine body 1 is cooled by a coolant, a gas temperature inside the combustion chamber 6 varies as a combustion cycle progresses, whereas temperatures of the inner surfaces of the combustion chamber 6 are substantially fixed. Therefore, the cooling loss becomes large due to this temperature difference. For this reason, by forming the heat insulating layer 7 with a material having the low volumetric specific heat, the temperature of the heat insulating layer 7 changes corresponding to the variation of the gas temperature inside the combustion chamber 6, and as a result, the cooling loss can be suppressed to be small.

For example, the heat insulating layers 7 are formed by coating the inner surfaces of the combustion chamber 6 with a ceramic material (e.g., $ZrO_2$) in a manner using plasma thermal spraying. Note that the ceramic material may have multiple pores so that the thermal conductivity and volumetric specific heat of the heat insulating layer 7 become even lower.

The crown surface 5a of each piston 5 has a cavity 10 formed by denting to an opposite side from the cylinder head 4 (downward) an area including a center of the crown surface 5a. The cavity 10 is formed to have a volume corresponding to a major part of the combustion chamber 6 when the piston 5 is at the TDC.

In this embodiment, a geometric compression ratio of the engine body 1, in other words, a ratio of a volume of the combustion chamber 6 when the piston 5 is at a bottom dead center (BDC) to a volume of the combustion chamber 6 when the piston 5 is at the TDC is set to be between 18:1 and 35:1 (e.g., about 20:1).

The cylinder head 4 is formed with intake ports 16 for introducing air (fresh air and, depending on an operating state of the engine, the EGR gas) supplied from the intake passage 30 into the respective cylinders 2 (combustion chambers 6), and exhaust ports 17 for guiding out the exhaust gas generated inside the respective cylinders 2 to the exhaust passage 40. The cylinder head 4 is further provided with the intake valves 18 for opening and closing the respective intake ports 16 on the cylinder 2 side, and the exhaust valves 19 for opening and closing the respective exhaust ports 17 on the cylinder 2 side, respectively. In this embodiment, each cylinder 2 is formed with one intake port 16 and one exhaust port 17, and provided with one intake valve 18 and one exhaust valve 19. Note that, in the example of FIG. 4, an inner surface of each intake port 16 is also formed with a heat insulating layer 181.

Each intake valve 18 is opened and closed by an intake valve timing mechanism. The intake valve timing mechanism is provide with intake variable valve timing mechanisms 18a (see FIG. 6) capable of changing open and close timings of the intake valves 18, and the open and close timings of the intake valves 18 are changed according to an operation condition, etc.

Further, fuel injectors 21 for injecting the fuel into the cylinders 2 and the water injectors 22 for injecting the supercritical water into the cylinders 2, respectively, are attached to the cylinder head 4. As illustrated in FIG. 4, the fuel injector 21 and the water injector 22 for the same combustion chamber 6 are arranged adjacent to each other at the cylinder head 4 so that tip parts of the injectors are located near a center axis of a corresponding cylinder 2 and oriented toward a substantially center portion of the cavity 10.

As described above, each water injector 22 injects the supercritical water (hereinafter, may simply be referred to as the "water" unless otherwise defined) sent from the water injection pump 63 into the cylinder 2. The water injector 22 has an injection port at its tip part, and a water injection amount is adjusted by changing an open period of the injection port. As the water injector 22, for example, an injector for injecting fuel into the cylinder 2, which is used in conventional engines, may be applied, and a description of a specific structure thereof is omitted. Note that the water injector 22 injects the supercritical water into the cylinder 2 at about 20 MPa, for example.

Figure 5:
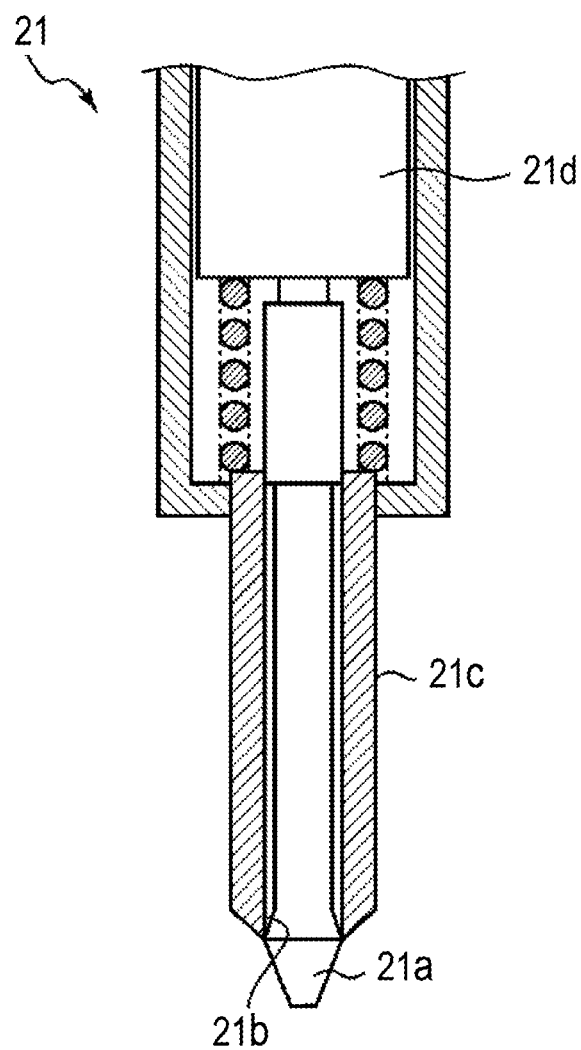
FIG. 5 is a cross-sectional view schematically illustrating a fuel injector.

Each fuel injector 21 injects the fuel sent from a fuel pump (disposed out of the range of the drawings) into the cylinder 2. In this embodiment, the fuel injector 21 is an outward opening valve type. The structure of the fuel injector 21 is briefly described by using FIG. 5 which is a schematic cross-sectional view of the fuel injector 21. As illustrated in FIG. 5, the fuel injector 21 has a fuel tube 21c formed with a nozzle port 21b at a tip part thereof, and an outward opening type valve 21a disposed inside of the fuel tube 21c for opening and closing the nozzle port 21b. The outward opening type valve 21a is connected with a piezo element 21d for deforming according to applied voltage, and positionally shifts between an opening position and a closing position according to the deformation of the piezo element 21d. At the opening position, the outward opening type valve 21a protrudes from the nozzle port 21b to the tip side to open the nozzle port 21b. At the closing position, the outward opening type valve 21a closes the nozzle port 21b.

In this embodiment, the premixed charge compression self-ignition combustion is performed, in which the fuel and air are premixed to form a mixture gas and the mixture gas is compressed to self-ignite near the TDC on compression stroke (CTDC) throughout all operating ranges of the engine body. Accordingly, in the example of FIG. 4, ignition plugs for igniting the gas inside the cylinders 2 are not provided to the engine body 1; however, in a case where an additional ignition power is required for suitable combustion of the mixture gas in a cold start etc., the ignition plugs may suitably be provided to the engine body 1.

(3) Control System (3-1) System Configuration

Figure 6:
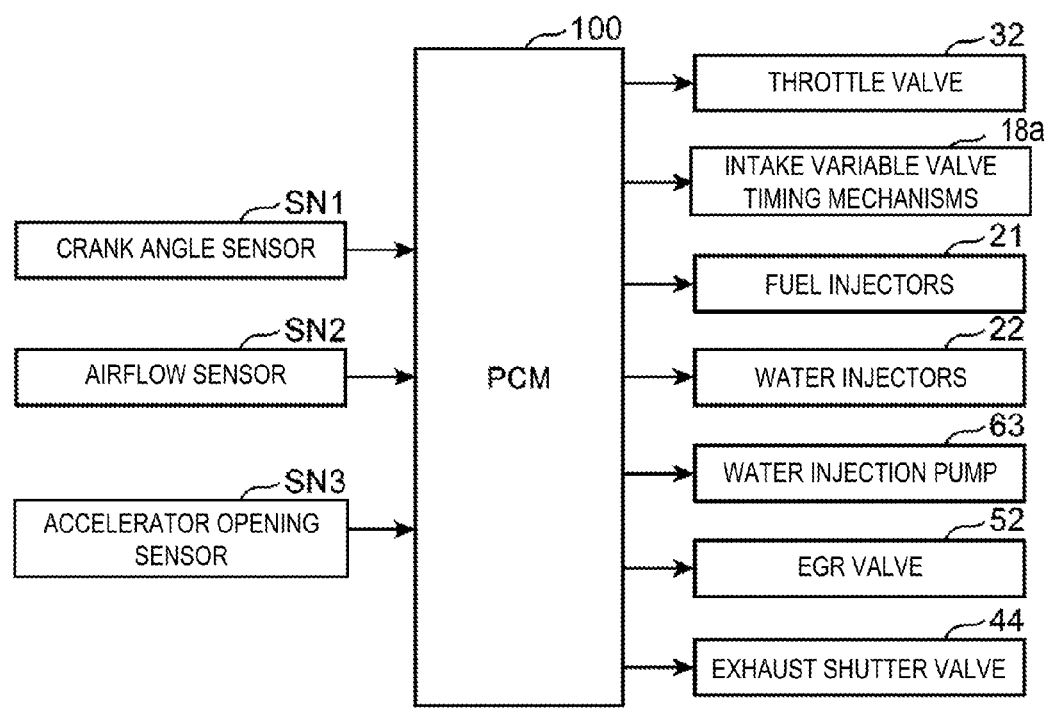
FIG. 6 is a block diagram illustrating a control system of the engine.

FIG. 6 is a block diagram illustrating a control system of the engine. As illustrated in FIG. 6, the engine system of this embodiment is controlled by a Powertrain Control Module (PCM) 100 as a whole. The PCM 100 (controller) is, as is well-known, comprised of a microprocessor including a CPU, a ROM, and a RAM.

The PCM 100 is electrically connected with various sensors for detecting an operating state of the engine.

For example, the cylinder block 3 is provided with a crank angle sensor SN1 for detecting a rotational angle and speed of a crankshaft, in other words, an engine speed. Further, an airflow sensor SN2 for detecting an air amount (fresh air amount) to be sucked into the cylinders 2 through the air cleaner 31 is provided in the intake passage 30, between the air cleaner 31 and the throttle valve 32. Moreover, an accelerator opening sensor SN3 for detecting a position of an accelerator pedal (accelerator opening) which is disposed out of the range of the drawings and controlled by a driver of the vehicle is provided to the vehicle.

The PCM 100 controls respective parts of the engine while performing various determinations, operations etc. based on input signals from the various sensors. Specifically, the PCM 100 is electrically connected with the fuel injectors 21, the water injectors 22, the throttle valve 32, the exhaust shutter valve 44, the EGR valve 52, the water injection pump 63, etc., and outputs control signals to these components based on results of the operations, etc.

Figure 7:
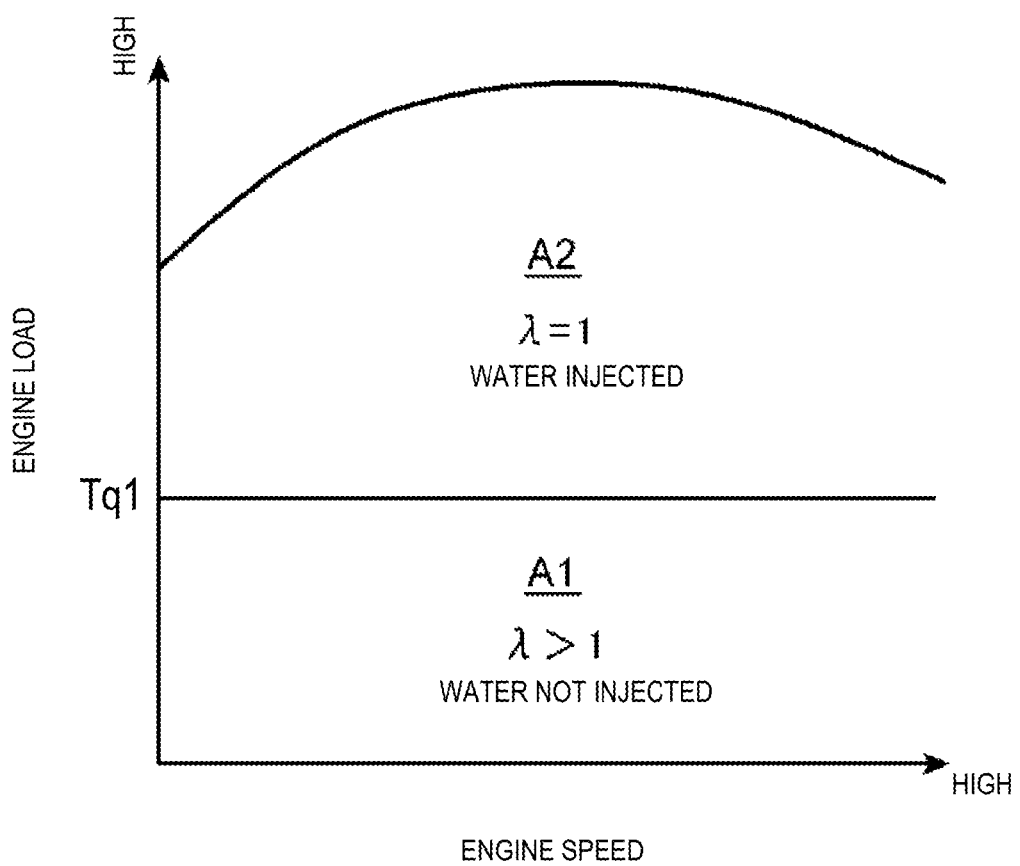
FIG. 7 is a chart illustrating a control range of the engine.

FIG. 7 is a control map of which a horizontal axis indicates the engine speed and a vertical axis indicates an engine load. In this embodiment, since the premixed charge compression self-ignition combustion is performed throughout all the operating ranges as described above, to achieve suitable premixed charge compression self-ignition combustion in every operation condition, a low engine load range A1 where the engine load is a predetermined reference load Tq1 or below, and a high engine load range A2 (critical water injecting range) where the engine load is higher than the reference load Tq1 are set as control ranges. Hereinafter, contents of the control in the respective ranges A1 and A2 are described.

Here, the PCM 100 includes an engine load determining module for receiving a parameter of the engine load that varies based on the accelerator opening, and determining whether an operating state of the engine body is a first state where the engine load is below a predetermined switch load (described later) or a second state where the engine load is the predetermined switch load or above.

(3-2) Low Engine Load Range

Within the low engine load range A1, a requested engine torque is low, and thus, an effective compression ratio may be set small. Therefore, within the low engine load range A1, the effective compression ratio is set to a low value so as to reduce a pumping loss and increase energy efficiency. For example, the effective compression ratio is reduced lower than 15:1. Specifically, each intake valve 18 is closed at a comparatively retarded timing on a retarding side of the BDC on intake stroke by the intake variable valve timing mechanism 18a, and thus, the effective compression ratio is reduced.

Within the low engine load range A1, since a heat generation amount of the mixture gas is small and a combustion temperature is comparatively low, an amount of No (so-called Raw $No_x$) produced by the combustion becomes low. Thus, within this range A1, there is no need to purify $No_x$ by the three-way catalyst 41, and an air-fuel ratio is not required to be a theoretical air-fuel ratio at which the No can be purified by the three-way catalyst. Therefore, within the low engine load range A1, the air-fuel ratio of the mixture gas is set to be lean, in other words, an air excess ratio $\lambda > 1$, so as to improve fuel consumption.

Further within the low engine load range A1, in a latter half of the compression stroke (between 90° CA before the CTDC and the CTDC), all the fuel for one combustion cycle is injected into each cylinder 2 at once by the fuel injector 21. For example, all the fuel is injected into the cylinder 2 near 30° CA before the CTDC.

Here, if an ignition delay time (a period of time from the injection of the fuel into the cylinder 2 to an ignition of the mixture gas) is short, the combustion starts in a state where the injected fuel is not sufficiently mixed with air. Thus, in this case, pressure inside the cylinder 2 (in-cylinder pressure) sharply increases, which causes issues of worsening combustion noise and producing more smoke.

Therefore, within the low engine load range A1, the EGR gas, which is a substance other than fuel and air, in other words, an inactive substance, is recirculated into the cylinder 2 so as to secure a suitable length of ignition delay time and start the combustion after the fuel is sufficiently mixed with air. Specifically, by introducing the EGR gas, which is the inactive substance, into the cylinder 2, a ratio of an amount of the fuel and air to a total gas amount inside the cylinder 2 becomes small, and an increase in the gas temperature inside the cylinder 2 is suppressed. Therefore, a reaction speed of the fuel and air is reduced and the ignition delay time can be extended.

Specifically, within the low engine load range A1, the EGR valve 52 is opened, and a portion of the exhaust gas inside the exhaust passage 40 is recirculated to the intake passage 30, as the EGR gas. Moreover, within an engine operating range where the engine load is extremely low and pressure inside the exhaust passage 40, in other words, pressure on the upstream side of the EGR passage 51, is low, the opening of the exhaust shutter valve 44 is narrowed and the EGR gas recirculation is stimulated.

In this embodiment, within the low engine load range A1, the EGR gas is recirculated so that a G/F which is a ratio of a total gas weight inside the cylinder 2 to the fuel amount becomes 35 or above.

Moreover, since the ignition delay time easily becomes short as the engine load increases and the injected fuel amount increases, an EGR ratio (a ratio of a weight of the EGR gas to a weight of all substances inside the cylinder 2) is increased as the engine load becomes higher, so as to suitably secure the ignition delay time in every engine load. A solid line of FIG. 8 indicates an EGR ratio with respect to the engine load at a predetermined engine speed. As indicated by the solid line of FIG. 8, in this embodiment, the weight of EGR gas is increased in proportion to the engine load within the low engine load range A1.

Figure 8:
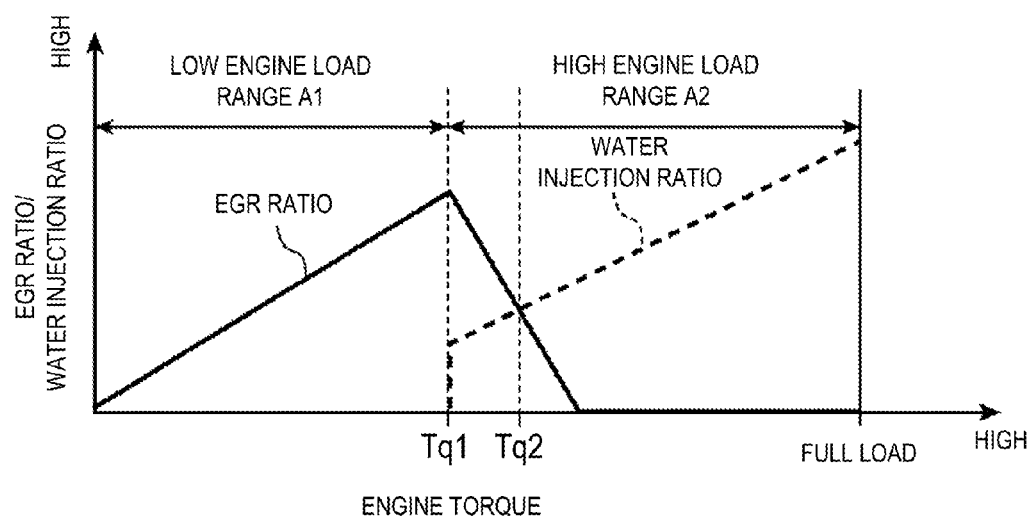
FIG. 8 is a chart illustrating a relationship among an engine load, an EGR ratio, and a water injection ratio.

In FIG. 8, the dashed line indicates a water injection ratio which is a ratio of a weight of the supercritical water injected into the cylinder 2 from the water injector 22, to the weight of all substances inside the cylinder 2. As indicated by the dashed line of FIG. 8, within the low engine load range A1, the injection of the supercritical water into the cylinder 2 by the water injector 22 is stopped. Accordingly, the drive of the water injection pump 63 is stopped.

As described above, within the low engine load range A1, the injection amount of the supercritical water into the cylinder 2 is set to zero, which is smaller than the EGR gas amount introduced into the cylinder 2.

Figure 9:
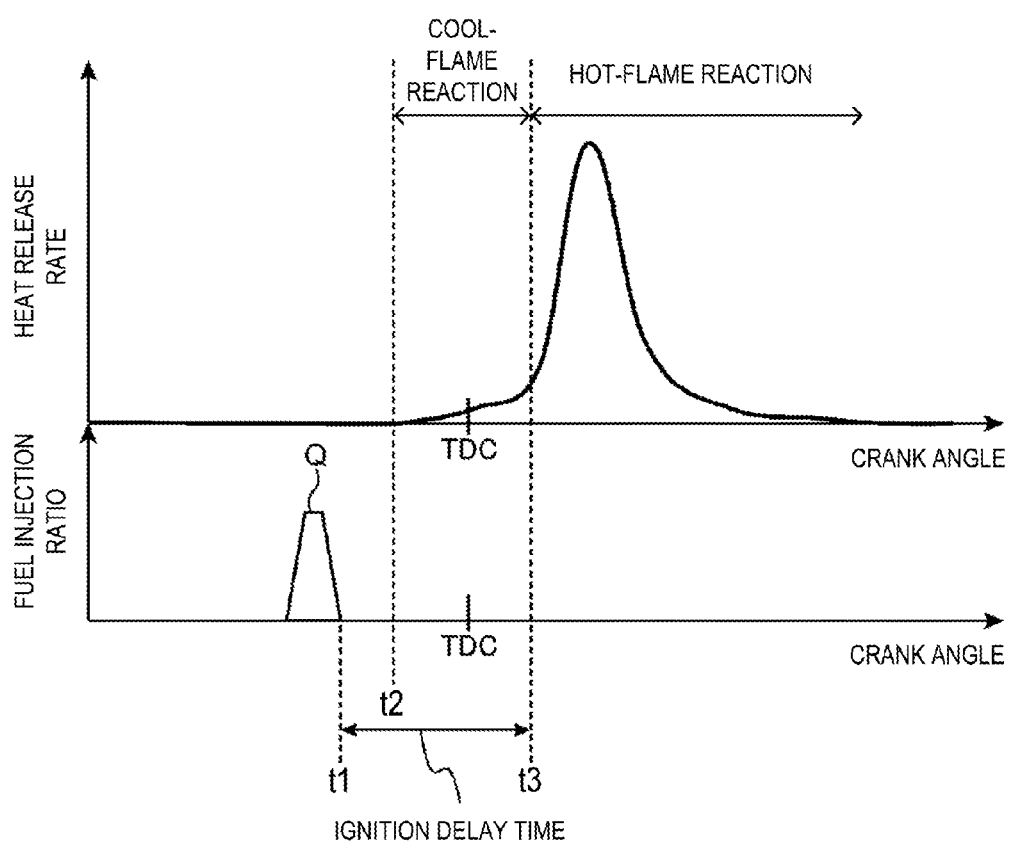
FIG. 9 shows charts illustrating an ignition delay time.

Here, in the above-described definition that the ignition delay time is the time period from the fuel injection to the ignition timing of the mixture gas, the ignition timing is a timing at which a cool-flame reaction of the mixture gas is completed and a hot-flame reaction starts, for which a specific description is given with reference to FIG. 9.

FIG. 9 is a chart schematically illustrating one example of an injection pulse and a heat release rate when the premixed charge compression self-ignition combustion is performed. As illustrated in FIG. 9, in the premixed charge compression self-ignition combustion, the fuel is injected at a timing t1 (injection Q), then the mixture gas starts releasing heat (oxidation reaction) at a timing t2 at which the temperature and pressure reach predetermined values, and accordingly, the heat release rate gradually increases or first gradually increases and then drops. Then, at a timing t3, the heat release rate sharply increases.

Here, low-temperature heat release which is the reaction occurring between the timings t2 and t3 and causes a slight heat generation to the extent that the cooling loss, etc. do not occur, is referred to as the cool-flame reaction. Main combustion which occurs after the cool-flame reaction is referred to as the hot-flame reaction. Further, the timing at which the hot-flame reaction starts (the timing at which the heat release rate sharply rises, corresponding to the timing t3 in FIG. 9) is referred to as the ignition timing. A period of time from the fuel injection timing (the timing t1 in FIG. 9) to the ignition timing defined as described above is referred to as the ignition delay time. Note that, in FIG. 9, although the horizontal axis indicates the crank angle, the ignition delay time is a parameter defined by time, not the crank angle. Moreover, the hot-flame reaction is known to occur when the temperature of the mixture gas becomes about 1,500 K or above. Therefore, a timing at which the temperature of the mixture gas reaches or exceeds 1,500 K may be the ignition timing and a period of time to this timing may be the ignition delay time.

(3-3) High Engine Load Range

Within the high engine load range A2, the effective compression ratio is set larger than that within the low engine load range A1 to secure sufficient engine torque. In this embodiment, the effective compression ratio is set to be 15:1 or above within the high engine load range A2. Specifically, the close timing of each intake valve 18 is advanced more than that within the low engine load range A1 by the intake variable valve timing mechanism 18a, and thus, the effective compression ratio is set larger than that within the low engine load range A1.

Within the high engine load range A2, the air-fuel ratio is set to be the theoretical air-fuel ratio so that the $No_x$ can be purified by the three-way catalyst. In other words, the air excess ratio λ is 1.

Figure 10:
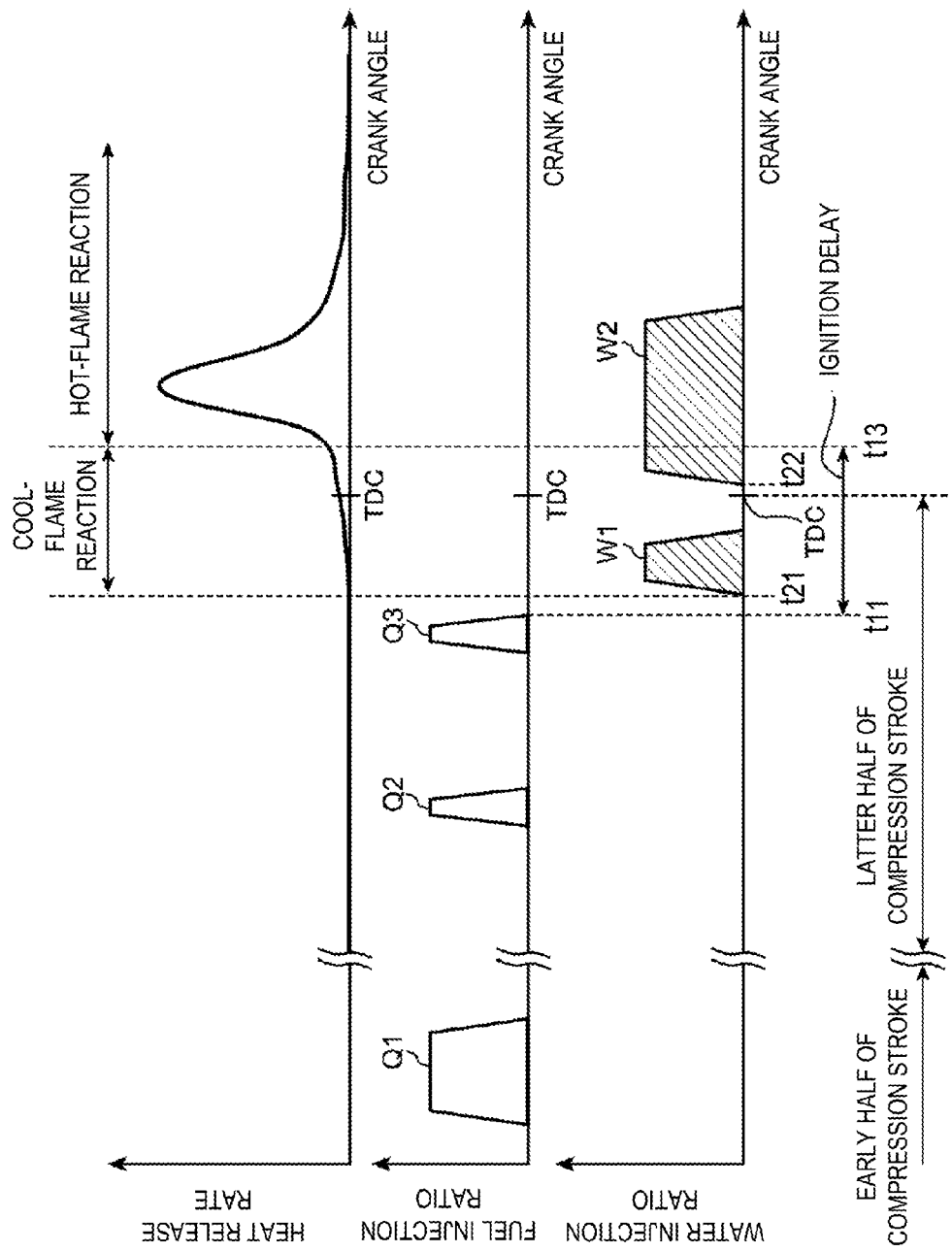
FIG. 10 shows charts illustrating contents of a control within a high engine load range.

Within the high engine load range A2, the engine load is high and the amount of fuel injected into the cylinder 2 is large. Thus, if such a large amount of fuel is injected into the cylinder 2 at once, the combustion may start in a state where the fuel is not sufficiently mixed with air. Therefore, within the high engine load range A2, as illustrated in FIG. 10, the fuel is divided into a plurality of injections into the cylinder 2. FIG. 10 illustrates one example of an injection pattern within the high engine load range A2. As illustrated in FIG. 10, within the high engine load range A2, a first injection Q1 in which a comparatively large amount of fuel is injected in an early half of the compression stroke (between the BDC on the intake stroke and 90° CA before the CTDC) is performed, a second injection Q2 in which a portion of the rest of the fuel is injected in the latter half of the compression stroke is performed, and then a third injection Q3 in which the rest of the fuel is injected at a timing slightly on the advancing side of the CTDC but on the retarding side of the second injection Q2 is performed.

The first injection Q1 is for homogenizing the mixture gas. In other words, by performing the first injection Q1 to inject the large amount of fuel in the early half of the compression stroke, the mixture gas inside the combustion chamber 6 near the CTDC, specifically, before the combustion starts, is homogenized. The first injection Q1 starts, for example, near 150° CA before the CTDC.

The third injection Q3 is for retarding the self-ignition of the mixture gas even more. By performing the third injection Q3 at the timing slightly on the advancing side of the CTDC, the homogeneous mixture gas generated by the first injection Q1 self-ignites after the CTDC. The third injection Q3 starts, for example, near 15° CA before the CTDC.

Specifically, within the high engine load range A2, since the temperature inside the cylinder 2 becomes high due to the large heat generation amount, if the combustion starts before the CTDC, an absolute value of the in-cylinder pressure (the pressure inside the cylinder 2) and an increase rate of the in-cylinder pressure become extremely high, and the combustion noise easily becomes loud. Therefore, in this embodiment, by performing the third injection Q3 near the CTDC to start the combustion while the piston descends, in other words, while the in-cylinder pressure decreases, the increase in the absolute value of the in-cylinder pressure and the increase rate of the in-cylinder pressure are reduced.

The second injection Q2 is for increasing combustion stability. Specifically, if the rest of the fuel is all injected at the comparatively retarded timing which is near the CTDC by the third injection Q3, as the piston 5 descends, the temperature inside the combustion chamber 6 may decrease to be below a combustible temperature before the combustion starts, and as a result, a misfire may occur. Therefore, in this embodiment, the second injection Q2 is performed before the third injection Q3 so as to keep the temperature inside the combustion chamber 6 at the combustible temperature or above even after the CTDC. The second injection Q2 is performed near 30° CA before the CTDC, for example.

Here, if the ignition delay time is short, the mixing of the fuel and air may become insufficient, and the combustion noise may become worse, and more smoke may be produced as described above. Therefore, the ignition delay time needs to be extended. Moreover, particularly within the high engine load range A2, the start of the combustion is preferably at a timing which is after the CTDC and further retarded compared to the low engine load range A1, so as to avoid the worse combustion noise as described above. Also for this reason, the ignition delay time is preferably extended.

In this regard, in this embodiment, within the high engine load range A2, to extend the ignition delay time, the supercritical water is injected into the cylinder 2 by the water injector 22. Specifically, by supplying the water (inactive substance) inside the cylinder 2 before the ignition timing, an oxygen concentration inside the cylinder 2 decreases and, thus, the reaction speed of the fuel and air is reduced and the ignition delay time can be extended. Note that the ignition delay time referred to here is a period of time from a latest fuel injection before the hot-flame reaction of the mixture gas occurs (i.e., the third injection Q3 in the injection pattern described above), to the start of the hot-flame reaction.

Specifically, the supercritical water is injected into the cylinder 2 by the water injector 22 between the latter half of the compression stroke and an early half of expansion stroke (between the CTDC and 90° CA after the CTDC). Further, the water injector 22 starts injecting the supercritical water after the third injection Q3 is completed and before the mixture gas ignites, so that the cool-flame reaction period overlaps with the water injection period.

In this embodiment, as illustrated in FIG. 10, a first water injection W1 in which the supercritical water is injected into the cylinder 2 is performed in a predetermined period of time from a completion timing t11 of the third injection Q3 to the CTDC (the first water injection W1 is started after the completion timing t11 of the third injection Q3 and completed before the CTDC). A second water injection W2 is started at a timing t22 which is after the CTDC and before an ignition timing t13. Moreover, a start timing t21 of the first water injection W1 is near the start timing of the cool-flame reaction.

Note that, in this embodiment, the injection amount of the first water injection W1 is substantially fixed regardless of the operation condition, whereas the injection amount of the second water injection W2 which is performed after the CTDC is increased as the engine load increases. Specifically, the start timing of the second water injection W2 is substantially fixed regardless of the operation condition, whereas the injection period of the second water injection W2 is set to be longer as the engine load increases. Accordingly, as indicated by the dashed line of FIG. 8, within the high engine load range A2, the water injection ratio is increased as the engine load increases.

Meanwhile, within the high engine load range A2, the EGR ratio is reduced. In this embodiment, as illustrated in FIG. 8, within the high engine load range A2, the EGR gas is recirculated only within a first segment of the high engine load range A2 where the engine load is low, and the EGR gas recirculation is stopped within a second segment of the high engine load range A2 where the engine load is higher than the first segment. Further, within the first segment, the EGR ratio is reduced as the engine load becomes higher. Specifically, within the high engine load range A2, as the engine load becomes higher, the EGR ratio is reduced from a highest value thereof within the low engine load range A1. In other words, the EGR ratio is increased as the engine load increases toward the reference load Tq1, and after the engine load exceeds the reference load Tq1, the EGR ratio is reduced as the engine load increases.

Further, in this embodiment, when the engine load is low, within an operating range where the engine load is lower than a switch load Tq2 (>reference load Tq1) of the high engine load range A2, and within the low engine load range A1, the water injection ratio is set to be smaller than the EGR ratio. When the engine load is the switch load Tq2 or above, the EGR ratio is set to be smaller than the water injection ratio. In other words, when the engine load is below the switch load Tq2, the amount of the supercritical water injected into the cylinder 2 is set to be smaller than the amount of EGR gas introduced into the cylinder 2, and when the engine load is the switch load Tq2 or above, the amount of EGR gas introduced into the cylinder 2 is set to be smaller than the amount of the supercritical water injected into the cylinder 2.

A reason for stopping the EGR gas recirculation or reducing the EGR ratio, and injecting the supercritical water within the high engine load range A2, is described next.

Within the high engine load range A2, since the engine load is high and the fuel injection amount is large, the ignition delay time easily becomes short. Therefore, to secure a suitable length of the ignition delay time by the EGR gas recirculation, a large amount of EGR gas is required. However, within the high engine load range A2, the air amount required for the combustion, in other words, the air amount to be introduced into the cylinder 2, becomes large due to the high engine load. For this reason, within the high engine load range A2, it becomes difficult to introduce a suitable amount of EGR gas into the cylinder 2.

Here, the introduction amount of EGR gas can be increased by a forced induction. However, the in-cylinder pressure becomes high in this case. If the pressure and temperature inside the cylinder 2 become high, the ignition delay time becomes short.

Thus, within the high engine load range A2, it is difficult to introduce the large amount of EGR gas, and even if the large amount of EGR gas is introduced, since it accompanies the forced induction, the in-cylinder pressure becomes high and the ignition delay time cannot be extended sufficiently.

In this regard, as described above, with the configuration of injecting the supercritical water into the cylinder 2, without the forced induction, in other words, without increasing the in-cylinder pressure, a large amount of the inactive substance can be introduced into the cylinder 2 and the ignition delay time can be extended.

Thus, within the high engine load range A2, the EGR gas recirculation is stopped or the EGR ratio is reduced, and the injection of the supercritical water is performed.

Further, in a high load segment (switch load Tq2 or above) of the high engine load range A2, the water injection ratio is increased to be larger than the EGR ratio.

Figure 11A:
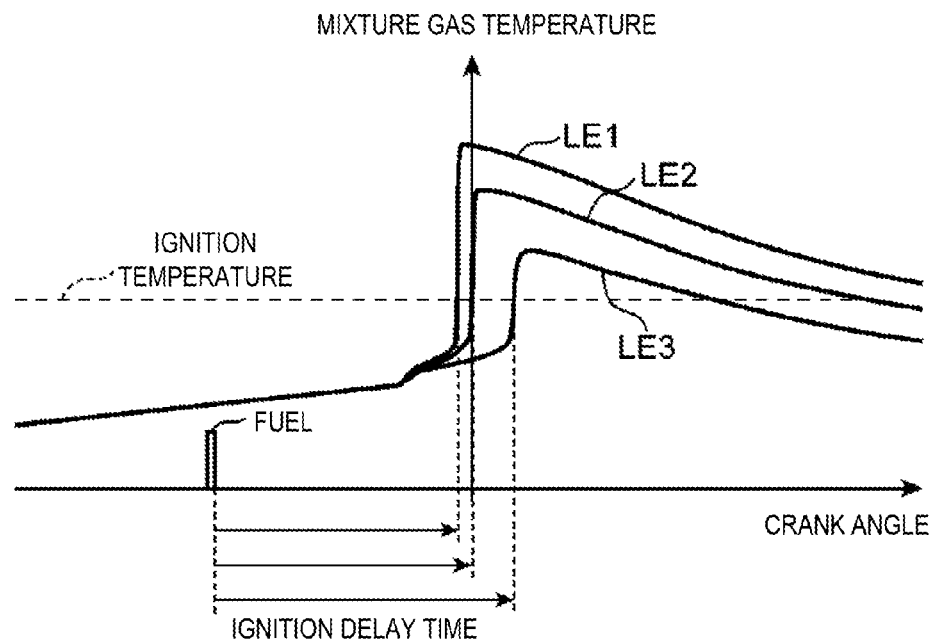
FIG. 11A is a chart illustrating a relationship between the EGR ratio and a temperature of mixture gas.
Figure 11B:
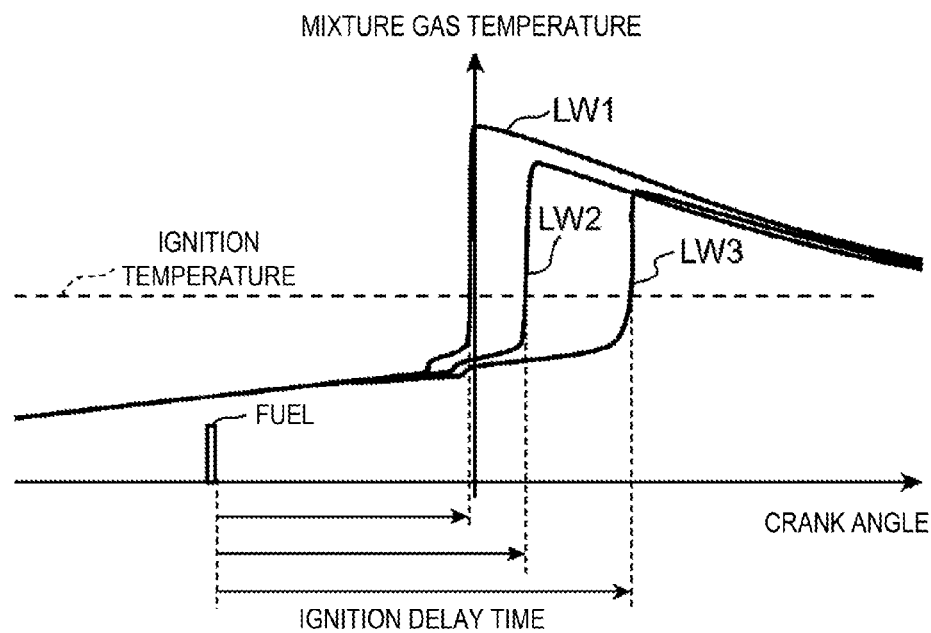
FIG. 11B is a chart illustrating a relationship between the water injection ratio and the temperature of the mixture gas.

FIG. 11A illustrates a temperature change of the mixture gas when the EGR ratio is changed in the case where the water injection is not performed. FIG. 11B illustrates a temperature change of the mixture gas when the injection amount of the supercritical water is changed in the case where the EGR gas recirculation is not performed. In FIG. 11A, lines LE1, LE2, and LE3 indicate mixture gas temperatures when the EGR ratio is approximately 20%, 40%, and 60% and forced-induction pressure is approximately 1.04 bar, 1.38 bar, and 2.07 bar (absolute pressure), respectively. In FIG. 11B, lines LW1, LW2, and LW3 indicate mixture gas temperatures when the ratio of the injection amount of the supercritical water to the fuel injection amount is 1, 3, and 4 times, respectively. Note that the forced induction is not performed while the supercritical water is injected.

As illustrated in these drawings, when one of the EGR ratio and the ratio of the water injection amount is increased, in either case, the ignition timing (the timing at which the temperature of the mixture gas exceeds the ignition temperature (1,500 K)) is retarded, and the ignition delay time extends. However, as is apparent from a result of a comparison between FIGS. 11A and 11B, the highest value of the ignition delay time becomes higher when the supercritical water is injected. For example, when the EGR is performed, even by increasing the EGR ratio to 60% (LE3), only an ignition delay time which is substantially the same as when the water injection amount is increased to about 3 times the fuel amount (LW2) can be obtained. In this regard, in the case of injecting the supercritical water, the ignition delay time can be extended by further increasing the water injection amount.

Here, it may be considered to inject the water in the normal gas phase as the inactive substance to be injected into the cylinder 2, instead of the supercritical water. However, since the water in the normal gas phase has the low density as described above, it is difficult to efficiently introduce a large amount of water into the cylinder 2.

Further, it may be considered to inject the water in the normal liquid phase. However, the water in the normal liquid phase becomes water vapor (i.e., water in the gas phase) when injected into the cylinder 2 at a high temperature. Moreover, the water in the normal liquid phase requires latent heat to become water vapor. Thus, in the case of injecting the water in the normal liquid phase, the temperature of the mixture gas significantly decreases due to the water vaporization, and thermal efficiency degrades.

Therefore, in this embodiment, as described above, the supercritical water (inactive substance) which does not require latent heat and has the high density is injected into the cylinder 2, and this supercritical water injection is performed when the temperature and pressure of the cylinder are high, which is between the latter half of the compression stroke and the early half of the expansion stroke (between the CTDC and 90° CA after the CTDC), so that the injected water remains in the state of supercritical water before the mixture gas ignition.

Further, for the start timing of the water injection, it may be considered to inject the supercritical water into the cylinder 2 before the fuel injection completes. However, the present inventors found through their extensive research that the ignition delay time can be extended longer if the start timing of the water injection is after the fuel injection completion (third injection Q3), rather than before the fuel injection completion.

Further, the present inventors found that even after the fuel injection completion, the ignition delay time can be extended to be longer when the supercritical water is injected during the cool-flame reaction, rather than before the cool-flame reaction. Furthermore, the present inventors also found that if the water is injected particularly in an initial stage of the cool-flame reaction, the heat release becomes even slower.

Therefore, in this embodiment, the first water injection W1 is performed before the CTDC and during the cool-flame reaction, particularly in the initial stage thereof. Further, the second water injection W2 is started during the cool-flame reaction similar to the first water injection W1. Thus, the injection period and the cool-flame reaction period are overlapped with each other in each of the water injections W1 and W2.

Here, the second water injection W2 after the CTDC is performed for, in addition to the purpose of extending the ignition delay time as described above, a purpose of stimulating the progression of the combustion cycle of the engine. In other words, by injecting the water into the cylinder 2 after the CTDC, the gas amount inside the cylinder 2 (the amount of substances including the supercritical water) is increased, and the progression of the expansion stroke can be stimulated. Therefore, in this embodiment, as described above, the second water injection W2 is started during the cool-flame reaction and after the CTDC. Further, the injection amount of the second water injection W2 is increased as the engine load becomes higher.

(4) Effects

As described above, in this embodiment, within the high engine load range A2, since the injection of the supercritical water into the cylinder 2 is started in the period between the fuel injection completion and the ignition timing and between the latter half of the compression stroke and the early half of the expansion stroke, the ignition delay time can be extended while suppressing the degradation of the thermal efficiency. Further, the combustion of the mixture gas can be started after the fuel is sufficiently mixed with air, and an increase in production of smoke, and the sharp increase in the in-cylinder pressure which results in increasing the combustion noise can be reduced. As a result, more suitable premixed charge compression self-ignition combustion can be achieved. Moreover, within the high engine load range A2, the start of combustion can be retarded even more, which also suppresses the increase in combustion noise.

Particularly in the high load segment (switch load Tq2 or above) of the high engine load range A2, the water injection ratio is set to be larger than the EGR ratio, and thus, the ignition delay time can be extended more reliably.

Further, in this embodiment, by providing the exhaust heat recovery device 60, the supercritical water is generated by using water vapor within the exhaust gas and thermal energy of the exhaust gas. Therefore, the energy efficiency can be improved.

Here, when the engine load is low, since the exhaust gas temperature is low, a required amount of supercritical water may not be generated. Further, in a case of compensating for a lack of energy by using, for example, a heater provided separately, the energy efficiency degrades. In this regard, in this embodiment, since the supercritical water injection is performed only within the operating range which is within the high engine load range A2 and in which the exhaust gas temperature is high, the energy efficiency can be improved.

(5) Modifications

In this embodiment, the case where the supercritical water (i.e., water) is injected into the cylinder 2 is described; however, as described above, instead of the supercritical water, subcritical water which has properties similar to the supercritical water may be injected into the cylinder 2. Also in this case, since the density is higher than normal water and required latent heat is extremely low, the ignition delay time can be extended.

Further, in this embodiment, the case where the supercritical water is injected into the cylinder 2 only within the high engine load range A2 is described; however, the operating range where the supercritical water is injected is not limited to this. For example, the supercritical water may be injected throughout all the operating ranges. Note that, also in this case, the injection amount of supercritical water is set to be smaller than the EGR gas amount within the low engine load range A1.

Further, in this embodiment, the case where the EGR gas recirculation is stopped when the engine load is the switch load Tq2 or above is described; however, the EGR gas recirculation may be performed when the engine load is the switch load Tq2 or above. Note that, also in this case, the EGR ratio is set to be smaller than the water injection ratio when the engine load is the switch load Tq2 or above.

Further, the switch load Tq2 may be the same as the reference load.

Further, the supercritical water may be generated by using, for example, a heater provided separately as described above, and omitting the exhaust heat recovery device 60. However, by using the exhaust heat recovery device 60, the suitable length of ignition delay time can be secured while increasing the energy efficiency.

Further, the specific value of the effective compression ratio within the high engine load range A2 is not limited to the above example. However, in this embodiment, the suitable length of ignition delay time can be secured more reliably within the high engine load range A2. Therefore, by setting the effective compression ratio to be 15:1 or above within the high engine load range A2 as described above, the engine torque can be increased while securing the ignition delay time.

Further, the injection patterns of the fuel and the water are not limited to the above example. For example, the second water injection W2 may be omitted. However, as described above, by performing the second water injection W2 after the CTDC, the engine torque can be increased.

Furthermore, the heat insulating layers 7 may be omitted. However, by providing the heat insulating layers 7, the cooling loss can be reduced and the fuel consumption can be improved. Further, in the case of providing the exhaust heat recovery device 60 as in this embodiment, the temperature of the exhaust gas can be increased by the heat insulating layers 7, and thus, the supercritical water can be generated more reliably.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine Body
2 Cylinder
21 Fuel Injector
22 Water Injector
42 Heat Exchanger (Heater and Compressor)
43 Condenser
51 EGR Passage
52 EGR Valve (EGR Gas Amount Adjuster)
60 Exhaust Heat Recovery Device (Water Processing Device)
100 PCM (Controller)
Tq2 Switch Load

What is claimed is:

1. A control apparatus of a premixed charge compression ignition engine that includes an engine body having a cylinder, an intake passage, and an exhaust passage, and causes a mixture gas to self-ignite inside the cylinder, comprising:
a fuel injector for injecting fuel into the cylinder;
a water injector for injecting one of supercritical water and subcritical water into the cylinder in a period from a latter half of compression stroke and an early half of expansion stroke;
an exhaust gas recirculation (EGR) passage for communicating the exhaust passage with the intake passage and recirculating, as EGR gas, a portion of an exhaust gas discharged from the cylinder to the intake passage;
an EGR valve for adjusting an amount of the EGR gas recirculating to the intake passage through the EGR passage; and
a controller for controlling various parts of the engine, the various parts including the water injector and the EGR valve,
wherein the controller includes an engine load determining module for receiving a parameter of a load of the engine that varies based on an accelerator opening, and determining whether an operating state of the engine body is a first state where the engine load is below a predetermined switch load or a second state where the engine load is the predetermined switch load or above,
wherein when the operating state is determined to be the first state by the engine load determining module, the controller outputs control signals to the EGR valve and the water injector, the control signals causing the EGR valve to introduce the EGR gas into the cylinder, and causing an injection amount of the one of the supercritical water and the subcritical water to be smaller than an introduction amount of the EGR gas into the cylinder, and
wherein when the operating state is determined to be the second state, the controller outputs control signals to the EGR valve and the water injector, the control signals causing the water injector to inject the one of the supercritical water and the subcritical water into the cylinder, and causing the introduction amount of the EGR gas into the cylinder to be smaller than the injection amount of the one of the supercritical water and the subcritical water.

2. The control apparatus of claim 1, wherein a geometric compression ratio of the engine body is set to be between 18:1 and 35:1, and
wherein an effective compression ratio of the engine body when the engine load is the switch load or above is set to be between 15:1 and 30:1.

3. The control apparatus of claim 2, wherein when the operating state is the second state, the controller sets an air excess ratio to be 1 or below at least while the engine load is high in the second state, and the controller stops the introduction of the EGR gas into the cylinder at least while the engine load is high in the second state.

4. The control apparatus of claim 3, further comprising a water processing device for generating the one of the supercritical water and the subcritical water, the water processing device including:
a condenser for condensing water vapor contained within the exhaust gas discharged from the engine body; and
a heater and compressor for increasing the condensed water vapor in temperature and pressure by supplying thermal energy of the exhaust gas to the condensed water vapor.

5. The control apparatus of claim 4, wherein the fuel contains gasoline.

6. The control apparatus of claim 3, wherein the fuel contains gasoline.

7. The control apparatus of claim 2, further comprising a water processing device for generating the one of the supercritical water and the subcritical water, the water processing device including:
a condenser for condensing water vapor contained within the exhaust gas discharged from the engine body; and
a heater and compressor for increasing the condensed water vapor in temperature and pressure by supplying thermal energy of the exhaust gas to the condensed water vapor.

8. The control apparatus of claim 7, wherein the fuel contains gasoline.

9. The control apparatus of claim 2, wherein the fuel contains gasoline.

10. The control apparatus of claim 1, wherein when the operating state is the second state, the controller sets an air excess ratio to be 1 or below at least while the engine load is high in the second state, and the controller stops the introduction of the EGR gas into the cylinder at least while the engine load is high in the second state.

11. The control apparatus of claim 10, further comprising a water processing device for generating the one of the supercritical water and the subcritical water, the water processing device including:
a condenser for condensing water vapor contained within the exhaust gas discharged from the engine body; and
a heater and compressor for increasing the condensed water vapor in temperature and pressure by supplying thermal energy of the exhaust gas to the condensed water vapor.

12. The control apparatus of claim 11, wherein the fuel contains gasoline.

13. The control apparatus of claim 10, wherein the fuel contains gasoline.

14. The control apparatus of claim 1, further comprising a water processing device for generating the one of the supercritical water and the subcritical water, the water processing device including:

a condenser for condensing water vapor contained within the exhaust gas discharged from the engine body; and a heater and compressor for increasing the condensed water vapor in temperature and pressure by supplying thermal energy of the exhaust gas to the condensed water vapor.

15. The control apparatus of claim 14, wherein the fuel contains gasoline.

16. The control apparatus of claim 1, wherein the fuel contains gasoline.

* * * * *